United States Patent [19]

Pool

[11] 4,221,512

[45] Sep. 9, 1980

[54] VALVE SEAT FORMING TOOL
[75] Inventor: James L. Pool, Clarinda, Iowa
[73] Assignee: Lisle Corporation, Clarinda, Iowa
[21] Appl. No.: 967,291
[22] Filed: Dec. 7, 1978
[51] Int. Cl.³ .................. B23B 51/00; B23D 77/02
[52] U.S. Cl. .................. 408/83.5; 408/157; 408/185
[58] Field of Search .......... 408/80, 181, 224, 225, 408/185, 707, 708, 81, 82, 83.5, 87, 93, 111, 137, 138, 157

[56] References Cited

U.S. PATENT DOCUMENTS

| | | | |
|---|---|---|---|
| 1,075,198 | 10/1913 | Crockatt | 408/83.5 |
| 1,487,533 | 3/1924 | Bryan | 408/196 X |
| 1,492,062 | 4/1924 | Baker | 408/707 X |
| 1,698,862 | 1/1929 | Wadell | 408/153 X |
| 1,721,310 | 7/1929 | Miller | 408/111 X |
| 2,788,682 | 4/1957 | Reed | 408/81 X |
| 3,354,528 | 11/1967 | Appleby | 408/228 |
| 3,728,940 | 4/1973 | Peterson | 408/83.5 |

FOREIGN PATENT DOCUMENTS 357403  3/1938  Italy ............................................ 408/80

*Primary Examiner*—Z. R. Bilinsky
*Attorney, Agent, or Firm*—Allegretti, Newitt, Witcoff & McAndrews

[57] ABSTRACT

A valve seat forming tool includes a pilot rod that may be inserted into the valve rod opening of an engine block. A cutter assembly including a pair of cutter blades projecting radially outwardly from the assembly is rotatably positioned on the rod and may be rotated to cause the cutter blades to engage and resurface a valve seat. The tool may be placed in a calibration block to calibrate blade position. Subsequent to calibration, the assembly is positioned over a valve seat of an engine block. The cutter blades are then radially adjustable by means of a micrometer and subsequent to adjustment the cutter blades are rotated manually to cause the blades to reform the surface of the valve seat.

22 Claims, 6 Drawing Figures

VALVE SEAT FORMING TOOL

BACKGROUND OF THE INVENTION

This invention relates to an improved valve seat forming tool and more particularly to a valve seat forming tool which may be used to accurately reform damaged or worn valve seats of an internal combustion engine.

Heretofore various mechanisms have been proposed to reform the valve seat of an internal combustion engine when that engine is being rebuilt. Reforming of the valve seat permits installation of new valve members or reground valves and constitutes an inexpensive way of reconditioning an engine thereby eliminating the necessity to secure a new engine or new engine block.

Among the various prior art references known to applicant which relate to tools for grinding or forming valve seats are the following:

| Pat. No.  | Inventor    | Title                                                         | Issue Date |
|-----------|-------------|---------------------------------------------------------------|------------|
| 1,325,278 | Dexter      | Facing Tool For Dressing Valve Seats                          | 12/16/19   |
| 1,487,533 | Bryan       | Valve Seating Tool                                            | 3/18/24    |
| 1,790,378 | Howser      | Valve Tool                                                    | 1/27/31    |
| 1,837,390 | Albertson   | Valve Seat Reconstruction Tool                                | 12/22/31   |
| 1,843,181 | Stougaard   | Valve Reseating Tool                                          | 2/02/32    |
| 1,846,890 | Miller      | Valve Reseating Tool                                          | 2/23/32    |
| 1,899,169 | Tyler       | Tool Holder                                                   | 2/28/33    |
| 1,902,207 | Albertson   | Valve Seat Tool                                               | 3/21/33    |
| 1,904,941 | Dunn        | Valve Reseating Tool Driver                                   | 4/18/33    |
| 1,954,241 | Hellyer     | Milling Tool                                                  | 4/10/34    |
| 1,962,273 | Harris et al| Seat Facer                                                    | 6/12/34    |
| 1,988,411 | Beard       | Valve Seat Refacing Tool                                      | 1/13/35    |
| 2,041,587 | Beard       | Refacing Tool For Valve Seats                                 | 5/19/36    |
| 2,082,461 | Pardieck    | Valve Seat Dresser                                            | 6/01/37    |
| 2,102,707 | Holhut      | Valve Seat Surfacing Tool                                     | 12/21/37   |
| 2,126,789 | Lindsey     | Apparatus for Conditioning Valves and Valve Seats             | 8/16/38    |
| 2,209,021 | Hawker      | Bibb Seating Tool                                             | 7/23/40    |
| 2,217,772 | Rottler     | Pilot Stem                                                    | 10/15/40   |
| 3,354,528 | Appleby     | Valve Seat Cutter                                             | 11/28/67   |
| 3,443,480 | Wells       | Means for Securing Cutters to Tools                           | 5/13/69    |
| 3,516,329 | Rendahl     | Cutting Tool for Valve Seats                                  | 6/23/70    |
| 3,552,758 | Minelli et al| Turning Head for Cutting Valve Seats of Internal-Combustion Engines | 8/04/70    |
| 3,664,756 | Wells       | Tool Depth Control Adjustment                                 | 5/23/72    |

The references disclose various mechanisms for reforming, refinishing or grinding a valve seat. Included among the mechanisms are very expensive grinding machines which are attached to the engine block and fit over the seat which is to be resurfaced. Many of the prior art devices position the cutter blades over the valve seat by means of a cantilever support. Using a support of this nature renders alignment of the blades with respect to the valve seat difficult.

Other valve seat tools propose a pilot rod which cooperates with the valve stem opening in the engine block. A cutter assembly is then positioned on the pilot rod.

However, none of the prior art references teach an inexpensive tool which combines the necessary elements to align the cutter blades with respect to the valve seat in a precise and reproducible manner and to permit adjustment of the blades for proper sizing of the valve seat opening and proper inclination of surfaces forming the valve seat. It is believed that the present invention provides the necessary combination of elements in a new and unique manner.

SUMMARY OF THE INVENTION

Briefly, the present invention comprises a valve seat forming tool which includes a pilot rod for insertion in a valve rod opening of an engine block. A cutter assembly is rotatably positioned on the rod and includes an advance mechanism for translating the assembly longitudinally on the rod. The cutter assembly also includes a cutter blade subassembly positioned so that blades attached at the end of the blade subassembly may be adjusted radially from the axis of the pilot rod to reform a valve seat.

A calibration block is utilized to initially set the cutter blades at a desired diameter and angle for forming a valve seat. The tool is then removed from the calibration block and positioned upon an engine block to form a valve seat. Once set, the tool may be transported from valve seat to valve seat without recalibration.

Thus, it is an object of the present invention to provide an improved valve seat forming tool.

Still a further object of the present invention is to provide an improved valve seat forming tool which is manually operable and which is adjustable to form complex valve seat surfaces cooperative with multiangled valves.

Still a further object of the present invention is to provide a valve seat forming tool which is economical to manufacture, easy to maintain and store and which reliably provides valve seat assemblies.

These and other objects, advantages and features of the invention will be set forth in the detailed description which follows.

BRIEF DESCRIPTION OF THE DRAWING

In the detailed description which follows reference will be made to the drawing comprised of the following figures.

DESCRIPTION OF THE PREFERRED EMBODIMENT

Figure 1:
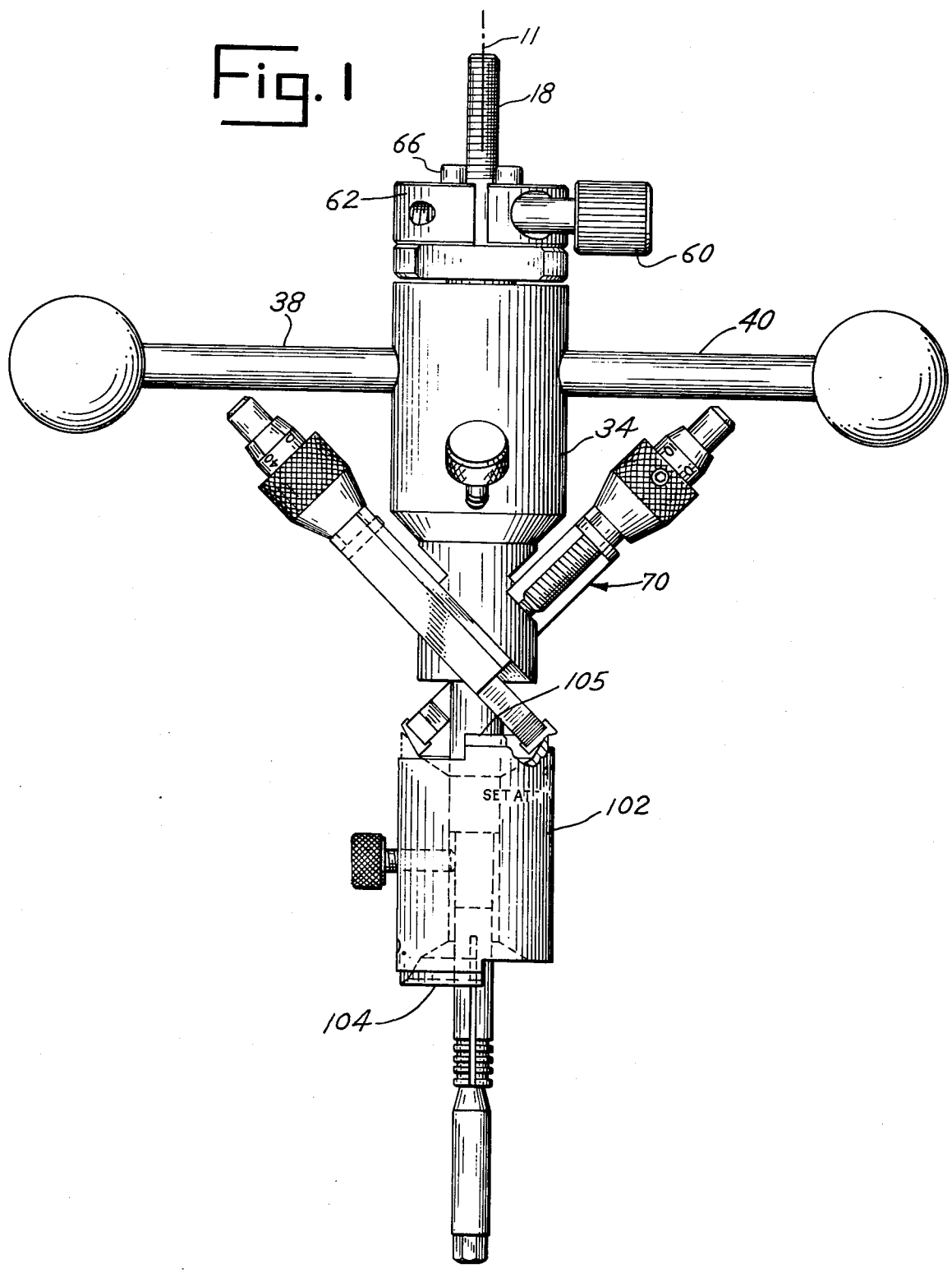
FIG. 1 is an assembly view of the improved tool of the present invention in combination with a calibration block.
Figure 2:
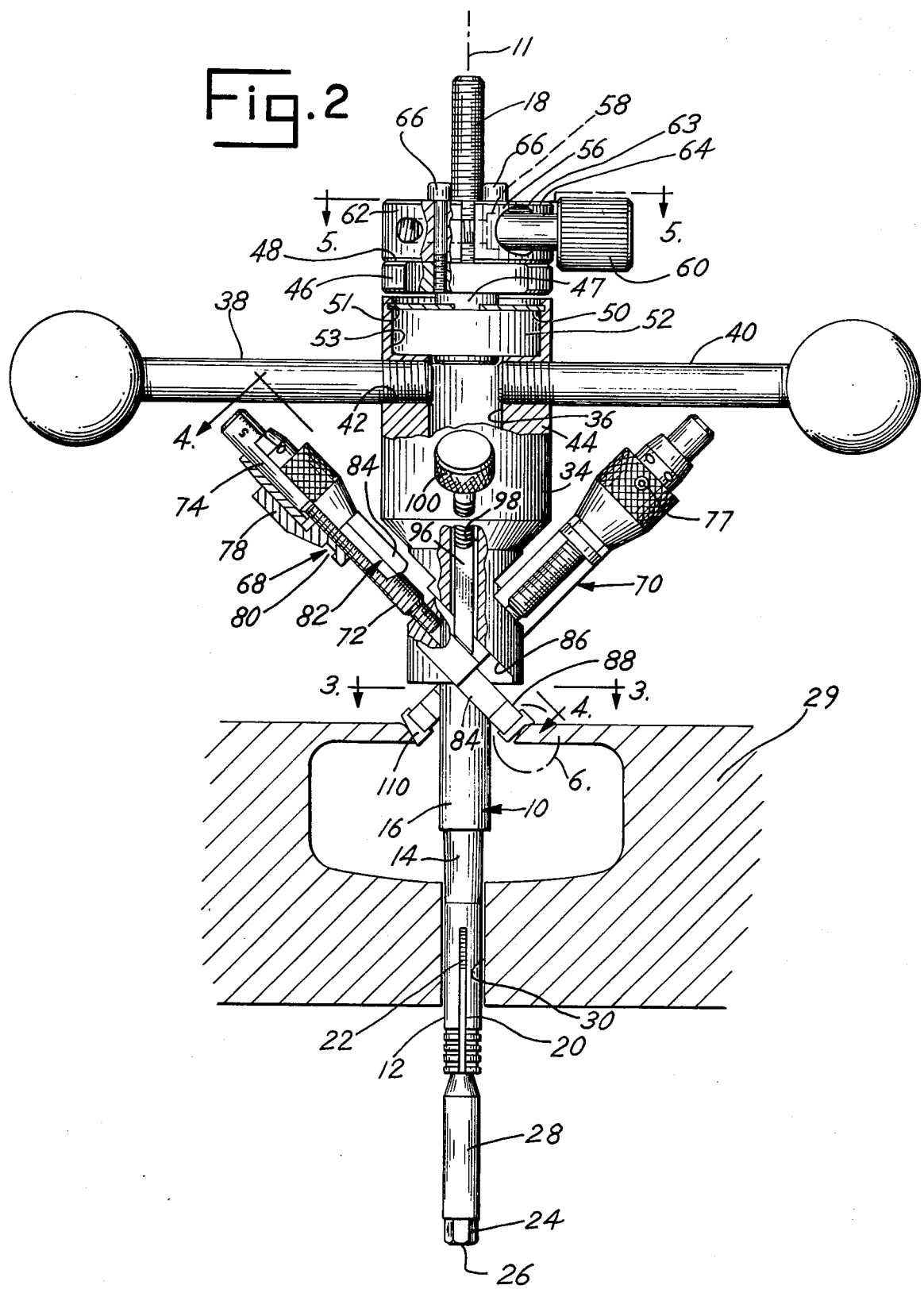
FIG. 2 is a partial cross sectional view of a typical engine block wherein the tool of the present invention has been positioned for reforming a valve seat.
Figure 3:
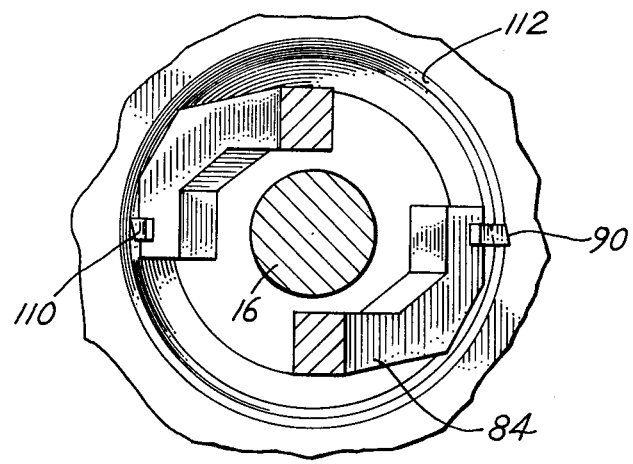
FIG. 3 is a cross sectional view of the cutter blade assembly taken substantially along the line 3—3 in FIG. 2.

In the detailed description which follows, reference will be made to FIGS. 1 and 2 for a description of the total assembly forming the valve seat forming tool of the present invention. FIG. 1 illustrates the tool as it is being calibrated. FIG. 2 illustrates the tool when actually in use. The remaining figures depict subassembly portions of the tool.

Referring therefore to the figures and particularly to FIGS. 1 and 2, the tool includes a pilot rod 10 defining a longitudinal axis 11. The pilot rod has a lower stem section 12 which is connected by means of a tapered section 14 to a larger diameter cutter mounting assembly section 16. Rod 10 terminates with a threaded end 18. The stem section 12 is split and includes cross slots 20. The slots 20 intersect with a threaded passage 22 which receives a bolt 24 having a head 26. Head 26 engages a wedge member 28 fitted over the bolt 24. When bolt 24 is turned it engages the wedge member 28 causing the segmented stem section 12 to spread thereby locking the pilot rod 10 firmly in position in a valve stem opening 30 of an engine block 32 as shown in FIG. 2. The cutter assembly and the attached components are then mounted on the rod 10 for translation in the direction of the longitudinal axis 11 along that rod 10.

A cutter advance assembly including subassemblies 68 and 70 is mounted on the rod 10. The cutter advance assembly comprises a body member 34 which is generally cylindrical in shape and includes an axial passage 36 which fits over the rod 10 so that the body member 34 may be rotated with respect to the rod 10. Projecting radially outwardly at the top of the body 34 are first and second handles 38 and 40. Handles 38 and 40 project in opposite radial directions. The handles 38 and 40 are threaded into threaded openings 42 and 44 respectively in the body member 34 and extend transversely to the axis 11.

Positioned above the handles 38 and 40 on top of the body member 34 is a cylindrical bearing member 46 which defines a top support surface 48. The bearing member 46 includes a downwardly projecting axial stem 47 which engages a bearing 52 so as to permit rotational movement of the bearing member 46 with respect to the bearing 52 member 34 while simultaneously maintaining the bearing member 46 and bearing 52 locked together for coincident longitudinal movement along axis 11. A lock washer or snap ring 50 fits in slot 51 defined in an axial counterbore 53 of body member 34 to secure the bearing member 46 and bearing 52 with the body member 34.

A split nut 56 includes internal threads 58 which cooperate with the threaded end 18 of rod 10. A manual adjustment knob 60 cooperates with the segments 62 and 64 forming the nut 56 to thereby engage or release threads 58 from threaded end 18. Segment 62 and 63 of the nut 56 are attached by means of cap screws 66 to bearing member 46 so as to slide on surface 48 to thereby insure coincident movement of the split nut 56 with the remainder of the cutter assembly.

Positioned at the opposite end of the body 34 are first and second cutter blade subassemblies 68 and 70. Each subassembly 68 and 70 is substantially identical except for the orientation with respect to the rod 10 reversed and end blades 90 and 110 may be distinct. Thus, in general, the description for one of the subassemblies 68 is considered applicable to both subassemblies 68 and 70.

Figure 4:
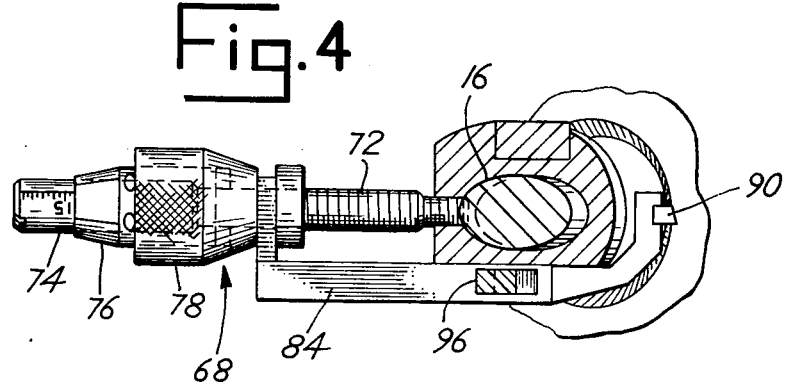
FIG. 4 is a cross sectional view showing an adjustable cutter blade subassembly taken substantially along the line 4—4 in FIG. 2.
Figure 5:
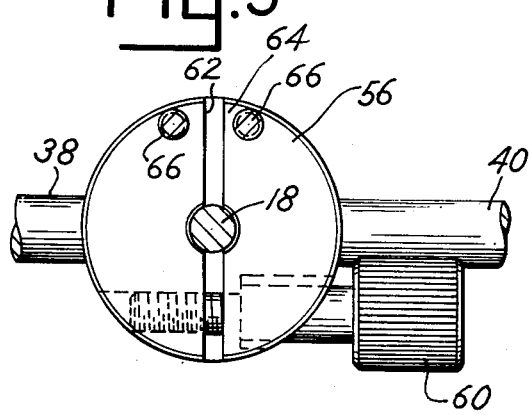
FIG. 5 is a cross sectional view of the advance mechanism associated with the tool taken substantially along the line 5—5 in FIG. 2.

Therefore, referring to FIGS. 2 and 4, the subassembly 68 includes a threaded pin 72 which projects radially and at an acute angle with the axis 11 from the body 34. The threaded pin 72 includes a cylindrical head 74 which is calibrated for cooperation with a micrometer sleeve 76 attached by a set screw 77 to a barrel 78. Barrel 78 is threaded on the pin 72. Thus, the barrel 78 may be rotated on the pin 72 to provide for a translation of the barrel 78 with respect to the pin 72.

The barrel 78 includes a circumferential slot 80 which co-acts with a U-shaped blade holder 82 and more particularly, the leg 81 of holder 82. Blade holder 82 also includes a longitudinally projecting arm 84 which fits within a guide slot 86 defined in the body member 34. Slot 86 is parallel with the pin 72. The arm 84 connects with a blade positioning section leg 88 which grips a cutting blade 90.

Figure 6:
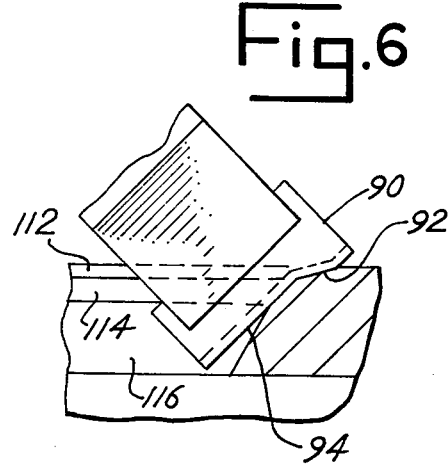
FIG. 6 is an enlarged cross sectional view of a cutter blade forming the surface of a valve seat for an engine block.

The cutting blade 90 as shown in FIG. 6 includes cutting blade surfaces 92 and 94 which are defined at angles of 30° and 45° respectively from the horizontal. Note that the blade edges 92 and 94 lie in a plane which passes through the axis 11.

To adjust the radial distance of the edges 92 and 94 from the axis 11, the barrel 78 is rotated about the stem or pin 72. The indicia on the head 74 associated with the micrometer 76 are calibrated to indicate the radial movement of the blade 90 and edges 92, 94 from or with respect to the axis 11. In the manner, it is possible to accurately control the radial dimension of a valve seat which is formed by the blade 90. In other words, the calibration on the head 74 is dependent upon the angle which the stem or pin 72 makes with the axis 11.

A vertical gib 96 mounted in a slot 98 in body 34 impinges against the arm 84. The gib 96 is retained against the arm 84 by a cutter locking screw 100 threaded into the body 34 so that the end of screw 100 thereof will engage the gib 96. Thus, the screw 100 may be loosened so that the barrel 78 may be rotated to appropriately adjust the position of the blade 90. Upon adjustment of the position of the blade 90, the screw 100 is tightened against gib 96 which, in turn, locks against arm 84 so that the subassembly 68 remains in a substantially fixed position.

To initially calibrate the position of the cutter blade 90, a calibration block 102 is adapted to receive the pilot rod 10 as shown in FIG. 1. The gib 96 is released and the blade 90 is then set against a calibration surface 104 of block 102 by rotating the barrel 78. A set screw 77 then may be released to permit rotation of the micrometer head 74 with respect to the barrel 78 so that the head setting may be adjusted to a "zero" setting. Adjustments from this initial setting then will precisely define the radius of the valve seat cut by the blade 90.

The subassembly 70 is fashioned in a similar manner to the subassembly 68 through a blade 110 associated with subassembly 70 projects in exactly the opposite direction from blade 90. Blades 110 and 90 are adjusted to equal radial distances. Blade 110 is also adjusted to cut at 60° from the horizontal. Thus, blade 90 referring to FIG. 6 cuts valve surfaces 112 and 114. Blade 110 cuts valve surface 116.

In operation the tool is calibrated as depicted in FIG. 1. Calibration block 102 and cooperative calibration surface 104 serve to calibrate blades of one configuration such as blades 90. At the opposite end of the calibration block 102 a second calibration surface 105 serves to calibrate a different type of blade such as blade 110.

Subsequent to calibration, the device is inserted in an engine block 29 by inserting the rod 10 into the valve stem opening 30. The split nut 56 is tightened down so as to bring the blades 90 and 110 into contact with valve surfaces 112, 114 and 116. The handles 38 and 40 are then used to rotate the body 34 and attached subassemblies 68 and 70. This, in turn, causes the blades 90 and 110 to cut the surfaces 112, 114 and 116 to the desired shape. The cut of the valve seat surface may be accurately controlled by means of the micrometers associated with the subassemblies 68 and 70. The split nut 56 may be advanced downwardly in order to cut the surfaces 112, 114 and 116 more deeply. Upon completion of resurfacing of a valve seat in the engine block 32, the device may be removed and repositioned in another valve stem opening. Recalibration is not necessary. Reproducibility of the seat forming operation is good.

While there has been set forth a preferred embodiment of the invention, it is to be understood that the tool may be altered while still providing the benefits and advantages associated with the invention. Therefore, the invention is to be limited only by the following claims and their equivalents.

What is claimed is:

1. A valve seat facing tool comprising, in combination:
   a pilot rod with a longitudinal axis and having a stem section at one end for positioning in a valve stem opening of an engine block, a cutter mounting assembly section extending longitudially from the stem section, an advance mechanism section at the opposite end;
   a cutter advance assembly including a body rotatably mounted on the cutter mounting assembly section, said body including an advance mechanism means cooperative with the pilot rod advance mechanism section to advance the body longitudinally along the axis of the pilot rod, and means for rotating the body;
   at least one cutter blade subassembly slidably attached to the body and rotatable therewith, said cutter blade subassembly extending from one side of the axis to the other and including a blade holder with a cutting blade at one end on one side of the axis and means on the other side of the axis for adjusting the position of the blade radially from the axis along a line through the axis, said means for adjusting including means connecting the body and the blade subassembly which means are manually operable to vary the relative position of the subassembly to the body, and;
   means for retaining the cutter blade subassembly in a fixed position with respect to the body.

2. The tool of claim 1 wherein said cutter blade subassembly includes a pin projecting from the body with the means for adjusting the position of the blade comprising micrometer means mounted on the pin for translation along the axis of the pin, said blade holder being attached to the micrometer means for coincident translation.

3. The tool of claim 2 wherein said pin is threaded and said micrometer means comprises a micrometer barrel on the pin which is advanced by rotation on the threaded pin.

4. The tool of claim 1 including first and second cutter blade subassemblies projecting in opposite directions from the pilot rod axis.

5. The tool of claim 4 wherein each cutter blade subassembly is separately adjustable.

6. The tool of claim 1 wherein the advance mechanism means includes a thread engaging member cooperative with threads defined on the advance mechanism section of the rod, and also includes a bearing member on the body for engagement by the thread engaging member.

7. The tool of claim 6 wherein said thread engaging member comprises a split nut.

8. The tool of claim 6 wherein said thread engaging member comprises a split nut which is adjustable.

9. The tool of claim 1 including means for calibrating the tool.

10. The tool of claim 9 wherein said means for calibrating comprise a calibration jig including an opening for the rod and at least one standard valve seat surface in a plane substantially transverse to the opening.

11. The tool of claim 1 wherein the means for rotating the body comprise at least one handle projecting laterally from the body.

12. The tool of claim 1 wherein said stem section of the pilot rod includes means for retaining the stem section in a rod opening of a block.

13. The tool of claim 1 wherein said stem section is split and a wedge member is adjustably engaged therewith to expand the stem section and retain the pilot rod in an opening.

14. The tool of claim 1 including a bearing member attached at one end of the body along the axis of the rod and freely rotatable with respect to the body.

15. The tool of claim 1 including means for locking the blade in fixed position with respect to the body.

16. The tool of claim 1 including a blade holder guide means in the body for receipt of the blade holder and means for locking the blade holder in a fixed position in the guide means.

17. The tool of claim 1 including a blade holder guide in the body for receipt of the blade holder; a gib slidably mounting a slot in the body and impinging against the blade holder; and means for retaining the gib against the blade holder to thereby fix the position of the holder in the guide.

18. The tool of claim 17 wherein said means for retaining comprise a locking screw threaded into the body and engaging the gib.

19. The tool of claim 1 wherein said body includes a guide slot and said blade subassembly includes a member extending from the body parallel to the slot, said blade holder being mounted on the member on one side of the body, extending through the slot to the other side of the body and terminating with a cutting blade fixed at the end whereby the blades include cutting edges which lie in a plane through the axis of the rod.

20. A valve seat forming tool comprising, in combination:
   a pilot rod with a longitudinal axis and having a stem section at one end for positioning in a valve seat opening of an engine block, an intermediate cutter mounting assembly section extending longitudinally from the stem section, and an advance mechanism section at the opposite end;
   a cutter advance assembly including a body rotatably mounted on the cutter mounting assembly section and means for rotating the body, said body including an advance mechanism means cooperative with the pilot rod advance mechanism section to advance the body longitudinally along the axis of the pilot rod and at least one guide slot passing transversely through the body;
   at least one cutter blade subassembly mounted in the guide slot and rotatable with the body, said cutter blade subassembly including an arm slidably positioned in the guide slot, a blade holder extending from one end of the arm, a micrometer means at the other end of the arm, and a micrometer mounting pin parallel to the guide slot and extending from the body for cooperation with the micrometer means, said micrometer means mounted on the pin and adjustable for coincident movement of the blade radially from the axis along a line through the axis.

21. A valve seat forming tool comprising, in combination:
   a pilot rod with a longitudinal axis and having a stem section at one end for positioning in a valve stem opening of an engine block, an intermediate cutter mounting assembly section extending longitudinally from the stem section, and an advance mechanism section at the opposite end;
   a cutter advance assembly including a body rotatably mounted on the cutter mounting assembly section and means for rotating the body, said body including an advance mechanism means cooperative with the pilot rod advance mechanism section to advance the body longitudinally along the axis of the pilot rod and a first and a second guide slot passing through the body in generally opposite directions and transverse to the pilot rod axis;
   a first and a second cutter blade subassembly mounted respectively in the first guide slot and the second guide slot, each of said cutter blade subassemblies including an arm slidably positioned in the respective guide slot, a blade holder extending from one end of the arm, a micrometer means at the other end of the arm, and a micrometer mounting pin parallel to the guide slot and extending from the body for cooperation with the micrometer means, said micrometer adjusting means mounted on the pin and adjustable for coincident movement of the blade radially from the axis along a line through the axis.

22. A valve seat forming tool comprising, in combination:
   a pilot rod with a longitudinal axis and having a stem section at one end for positioning in a valve stem opening of an engine block, an intermediate cutter mounting assembly section extending longitudinally from the stem section, and an advance mechanism section at the opposite end;
   a cutter advance assembly including a body rotatably mounted on the cutter mounting assembly section and means for rotating the body, said body including an advance mechanism means cooperative with the pilot rod advance mechanism section to advance the body longitudinally along the axis of the pilot rod, at least one guide slot in the body transverse to the axis, and at least one cutter retaining means mounted in the body;
   at least one cutter blade subassembly mounted in the guide slot and rotatable with the body, said cutter blade subassembly including an arm slidably positioned in the guide slot, a blade holder extending from one end of the arm, a micrometer means at the other end of the arm, and a micrometer mounting pin parallel to the guide slot and extending from the body for cooperation with the micrometer means, said micrometer means mounted on the pin and adjustable for coincident movement of the blade radially from the axis along a line through the axis, and said cutter retaining means adjustably retaining the the blade holder to fix the position of the blade holder relative to the axis.

* * * * *